April 19, 1932.     M. TIBBETTS     1,854,964
SHOCK ABSORBER
Filed Dec. 12, 1927
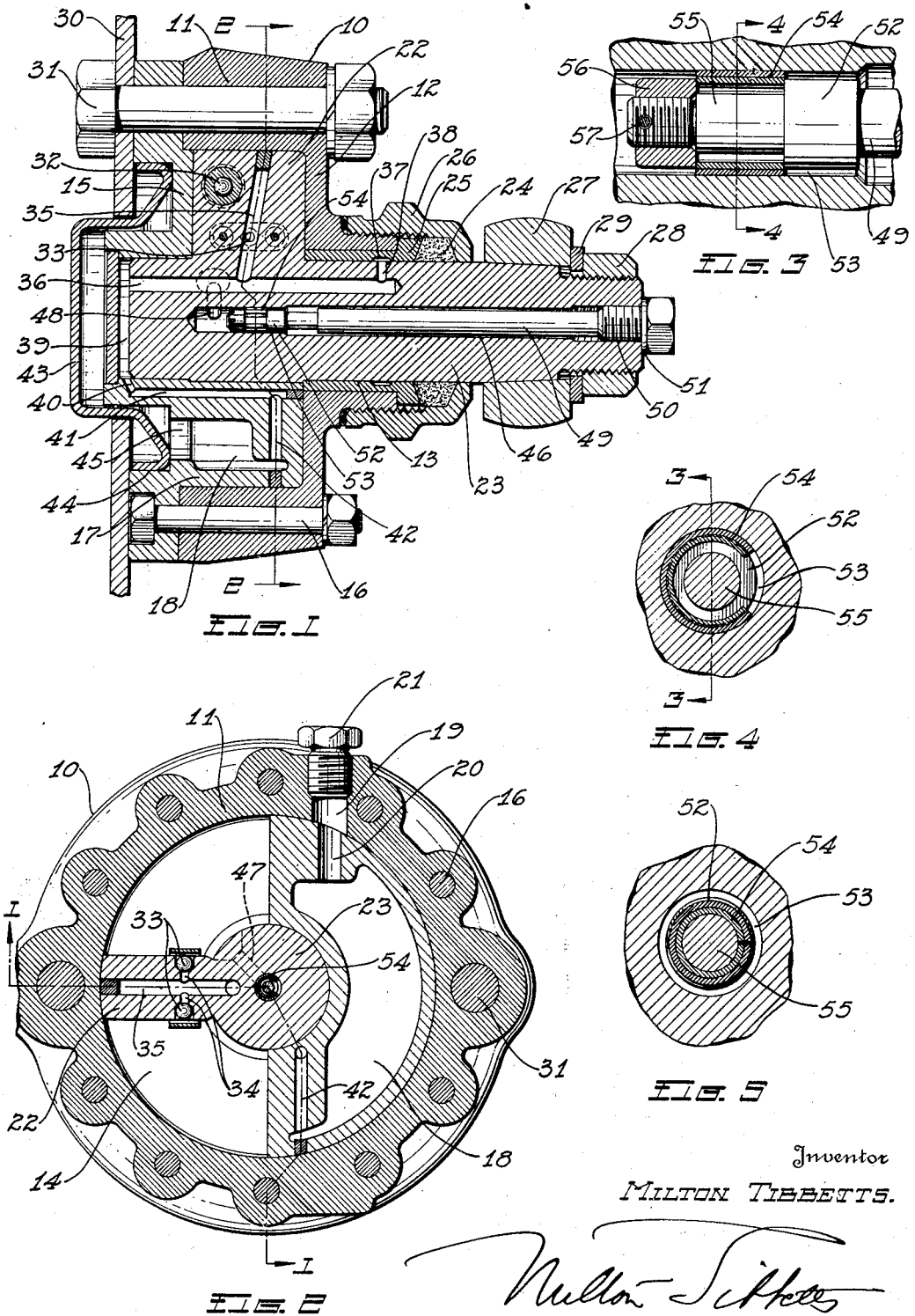
Inventor
MILTON TIBBETTS.

Patented Apr. 19, 1932

1,854,964

UNITED STATES PATENT OFFICE

MILTON TIBBETTS, OF DETROIT, MICHIGAN, ASSIGNOR TO THE PACKARD MOTOR CAR COMPANY, OF DETROIT, MICHIGAN, A CORPORATION OF MICHIGAN

SHOCK ABSORBER

Application filed December 12, 1927. Serial No. 239,346.

This invention relates to shock absorbers and particularly to shock absorbers of the hydraulic type used on motor vehicles between the frame and axle or between other relatively moving parts.

The power or resistance of hydraulic shock absorbers varies with variations in temperature. This is due to variations in the viscosity or fluidity of the liquid employed in the absorber which causes the liquid to flow more or less freely through the by-pass or other passages of the shock absorber. Heretofore, attempt has been made to obtain constant power or resistance in hydraulic shock absorbers by employing an adjustable by-pass, and changing the cross-sectional area of such by-pass by manual adjustment, but such means has proven unsatisfactory because of the frequent changes in the adjustment required and because such means in incapable of accommodation to the frequent increase in the fluidity of the liquid due to the heat developed during the operation of the absorber.

An object of the present invention is to provide a shock absorber having a by-pass, the cross-sectional area of which is automatically varied with variations in the temperature and viscosity of the liquid used in the absorber.

Another object of the invention is to provide a hydraulic shock absorber having a substantially unvarying shock absorbing action irrespective of changes in the viscosity of the liquid used in the absorber.

Another object of the invention is to provide a shock absorber, the power or resistance of which is independent of temperature changes.

Another object of the invention is to provide a shock absorber with a thermostatically controlled by-pass.

Other objects of the invention will appear from the following description taken in connection with the drawings which form a part of this specification, and in which:

Fig. 1 is a sectional view of a shock absorber embodying my invention, the section being substantially on line 1—1 of Fig. 2;

Fig. 2 is a section through the shock absorber taken substantially on line 2—2 of Fig. 1;

Fig. 3 is an enlarged sectional view of a portion of the shock absorber by-pass showing part of the metering plug and the thermostat mounted therein;

Fig. 4 is a sectional view on line 4—4 of Fig. 3 showing the thermostat in fully expanded position, and Fig. 5 is a sectional view similar to Fig. 4 showing the thermostat in fully contracted position.

Referring to the drawings, 10 is the body or casing of the shock absorber having a cylindrical portion 11, an end wall 12 and a bearing portion 13. The cylindrical portion and end wall are machined internally to form a working chamber 14 for the shock absorber. A cover 15 is fitted over the open end of the casing and is secured thereto by numerous bolts 16. The cover 15 has a semi-cylindrical extension 17 fitting into the cylindrical portion 11 of the casing, the extension being preferably cored out to form an auxiliary reservoir or reserve tank 18. A filling opening is provided by aligned passages 19 and 20 and is closed by plug 21. Both the working chamber and reservoir are substantially filled with any suitable liquid such as oil or glycerine.

A piston 22 mounted to oscillate in the working chamber 14 has a shaft 23 suitably supported in the casing and cover. A packing 24 is compressed against bearing sleeve 25 by a hollow nut 26 screwed on the bearing portion 13 of the casing. Outwardly of nut 26, shaft 23 is serrated and an arm 27 is mounted upon the serrated portion and held thereon by nut 28 and lock washer 29. The shock absorber is shown mounted upon a support 30 by means of two large bolts 31 extending through suitable openings in the casing and cover. Arm 27 is adapted for connection to a part which moves relatively to the support 30 in any suitable manner so that the piston will be operated in the working chamber as the vehicle parts move relatively to each other.

In order that arm 27 may operate with somewhat less resistance when moving in one direction than in the other, piston 22 is provided with a check valve 32 which permits the liquid in the working chamber to pass relatively freely through the piston in one direction but does not permit the liquid to pass through in the other direction. Piston 22 is also provided with a pair of check valves 33 arranged in passages 34 which communicate with a passage 35 and which in turn connects with a passage 36 in shaft 23. An annular leakage groove 37 is formed in bearing sleeve 25 and a passage 38 connects this leakage groove with passage 36. Any liquid escaping from the working chamber in the direction of bearing sleeve 25 will be caught in the leakage groove 37 and drawn back into the working chamber through passages 38, 36, 35 and 34 by reason of the suction existing on the retreating side of the piston. Liquid may be drawn into the working chamber from the lowermost part of the auxiliary reservoir 18 when needed through connected passages 34, 35, 36, 39, 40, 41 and 42. A plate 43 pressed into a cylindrical portion 44 of the cover 15 forms an enlargement of reservoir 18 an connects therewith by means of an opening 45.

Provision is made for by-passing some of the liquid equally on both strokes of the piston and in the shock absorber shown, this by-pass means is in the piston shaft itself. Shaft 23 is drilled from its outer end inwardly providing a passage 46 that extends through the zone of the piston. Two radial passages 47 and 48 connect with the drilled passage 46 in different zones and extend to opposite sides of the piston. A plug 49 threaded into the shaft 23 as at 50 makes a tight joint with the end of the shaft as at 51 so that there can be no leakage of liquid at that point. The plug is adapted to be turned up tight in the shaft since no adjustment is provided therefor. The inner end of the plug is formed with a restrictive head or metering portion 52 arranged between radial passages 47 and 48 which nearly closes that part of the passage 46 surrounding it. An annular passage 53 is thus formed between the walls of the passage 46 and the metering head 52. In the absence of other restrictive means, it will be apparent that the area of the annular passage 53 determines the quantity of liquid normally by-passed from one side of the piston to the other in the operation of the piston and consequently determines the power or resistance of the shock absorber. With changes in temperature, however, the viscosity or fluidity of the liquid changes and consequently at lower temperatures, the power or resistance of the shock absorber will be greater because the liquid will not flow as freely through the annular passage 53. The reverse, of course, is true at higher temperatures.

To provide for such change in the power or resistance of the shock absorber resulting from temperature changes, in order that a relatively wide temperature change will not affect the absorbing action or resistance of the shock absorber, a thermostat is utilized to vary the area of the annular passage 53 so that at lower temperatures a larger passage is provided than at higher temperatures. The thermostat preferably comprises a bimetallic split ring 54 preferably carried by the metering plug 49 at its inner end adjacent the metering head 52. The thermostat is mounted on a reduced portion 55 of the plug and is held thereon by any suitable means such as by nut 56 and pin 57. The thermostat is formed from two metals of suitably different coefficients of thermal expansion and as is well known, temperature changes will change the diameter of the ring and the extent of the opening between the ends of the ring. Thus at low temperatures, the ring will contract until its ends are together and it snugly fits the reduced portion 55 of the metering plug thereby providing an unrestricted annular passage 53 in the by-pass as clearly shown in Fig. 5, whereas, at higher temperatures, the ring will expand and restrict the annular passage to a degree depending upon the degree of expansion of the ring until the ring has fully expanded against the wall of the passage 46, when the annular passage 53 is restricted to the maximum extent, as shown in Figs. 1 to 4 inclusive, and the by-pass opening is defined by that portion of the annular passage 53 included between the open ends of the ring 54.

In the preferred form of this invention, the reduced portion 55 of the metering plug 49 is of a diameter such that when the thermostat ring is in fully contracted position with its ends substantially together as in Fig. 5, the exterior circumferential surface of the ring will lie inwardly of the circumferential surface of the metering portion 52 of metering plug 49. In this position the metering plug controls the by-pass instead of the thermostat. Consequently it will be apparent that for temperatures above a predetermined temperature when the external diameter of the thermostat and the diameter of the metering portion 52 are substantially the same, the thermostat will control the by-pass, while at temperatures below such predetermined temperature, the metering plug will control the by-pass.

In this way the cross-sectional area of the by-pass is automatically varied with variations in temperature and viscosity of the fluid employed, thus providing a shock absorber having substantially constant power or resistance irrespective of temperature changes. The bimetallic split ring thermostat accomplishes the desired result in an extremely simple yet highly effectual manner.

The form of my invention shown and described is to be considered merely as a pre-

Having thus described my invention, what I claim and desire to secure by Letters Patent is:

1. A shock absorber comprising a casing, a piston operable in the casing, by-pass means around the piston, a metering plug in the by-pass means and a thermostat associated with the metering plug, said thermostat controlling the by-pass within certain limits of temperature and the metering plug controlling the by-pass within other limits of temperature.

2. A shock absorber comprising a casing, a piston operable in the casing, by-pass means around the piston, a metering plug in the by-pass means and a thermostat associated with the metering plug, said thermostat controlling the by-pass above a predetermined temperature and the metering plug controlling the by-pass below said predetermined temperature.

3. In combination, a thermostat and a restrictive member adapted to control a passage, the thermostat controlling the passage at temperatures above a predetermined temperature and the restrictive member controlling the passage at temperatures below said predetermined temperature.

4. In combination, a split ring thermostat and an annular restrictive member mounted in an annular passage for controlling the passage, said thermostat adapted to vary in diameter from a diameter smaller than the diameter of the restrictive member to a diameter equal to that of the passage.

5. In combination, a thermostat and a metering plug mounted in a passage for controlling the passage, a metering head on said metering plug adjacent the thermostat, said thermostat adapted through contraction to become smaller than the metering head and through expansion to become larger than the metering head, whereby the passage is controlled by the thermostat when it is larger than the metering head and controlled by the metering head when the thermostat is smaller than the metering head.

6. A hydraulic shock absorber comprising a casing, a piston operable in the casing, a shaft for the piston, by-pass means in the shaft around the piston, a metering plug mounted in the by-pass means, the metering plug having a metering head and a bimetallic thermostat in the by-pass and carried by the metering plug adjacent the metering head, said plug and thermostat both directly controlling the by-pass.

7. In a shock absorber, a liquid containing casing, a piston operable in the casing, by-pass means around the piston, a metering plug in the by-pass means, and a thermostat in the by-pass and associated with the plug, said plug and thermostat independently controlling the flow of liquid through the by-pass within certain limits of temperature.

8. In a shock absorber, a casing, a piston operable in the casing, by-pass means around the piston, a metering plug in the by-pass, and a metallic thermostat in the by-pass and carried by the plug, said plug and thermostat independently and directly controlling the liquid flow through the by-pass within certain temperature ranges.

In testimony whereof I affix my signature.

MILTON TIBBETTS.